United States Patent
Yurduseven et al.

(10) Patent No.: US 11,038,263 B2
(45) Date of Patent: Jun. 15, 2021

(54) PRINTED CAVITIES FOR COMPUTATIONAL MICROWAVE IMAGING AND METHODS OF USE

(71) Applicant: Duke University, Durham, NC (US)

(72) Inventors: Okan Yurduseven, Durham, NC (US); Vinay Ramachandra Gowda, Durham, NC (US); Jonah Gollub, Durham, NC (US); David R. Smith, Durham, NC (US)

(73) Assignee: Duke University, Durham, NC (US)

( * ) Notice: Subject to any disclaimer, the term of this patent is extended or adjusted under 35 U.S.C. 154(b) by 276 days.

(21) Appl. No.: 15/769,950

(22) PCT Filed: Nov. 14, 2016

(86) PCT No.: PCT/US2016/061802
§ 371 (c)(1),
(2) Date: Apr. 20, 2018

(87) PCT Pub. No.: WO2017/083812
PCT Pub. Date: May 18, 2017

(65) Prior Publication Data
US 2018/0309197 A1    Oct. 25, 2018

Related U.S. Application Data

(60) Provisional application No. 62/254,272, filed on Nov. 12, 2015.

(51) Int. Cl.
*H01Q 1/38*  (2006.01)
*H01Q 13/18*  (2006.01)
(Continued)

(52) U.S. Cl.
CPC ............. *H01Q 1/38* (2013.01); *G01S 13/887* (2013.01); *H01Q 1/40* (2013.01); *H01Q 13/18* (2013.01);
(Continued)

(58) Field of Classification Search
CPC ............ H01Q 1/36; H01Q 1/38; H01Q 13/10; H01Q 13/18; H01Q 21/0025; H01Q 21/06;
(Continued)

(56) References Cited

U.S. PATENT DOCUMENTS 3,363,253 A * 1/1968 Ratkevich ............ H01Q 21/005
343/771
4,197,545 A * 4/1980 Favaloro .............. H01Q 13/106
343/700 MS
(Continued)

FOREIGN PATENT DOCUMENTS

WO    9610277 A1    4/1996

OTHER PUBLICATIONS

Fromenteze et al., "Computational imaging using a mode-mixing cavity at microwave frequencies" Applied Physics Letters, vol. 106, May 12, 2015; 8 pages. Doi: 10.1063/1.4921081.
(Continued)

*Primary Examiner* — Peter M Bythrow
(74) *Attorney, Agent, or Firm* — Olive Law Group, PLLC

(57) ABSTRACT

Systems and methods are disclosed herein for printed cavities for computational microwave imaging and methods or use. According to an aspect, an imaging system includes a printed cavity having a layer having a first surface and a second surface. The printed cavity defines multiple apertures that extend between the first surface and the second surface. The printed cavity also includes a substrate being attached to the first surface of the layer. The substrate is also configured
(Continued)

to be fed a guided wave that excites the apertures to produce a radiation pattern for illuminating a scene. The imaging system also include one or more antennas configured to generate a signal for imaging based on the illuminated scene.

28 Claims, 14 Drawing Sheets

(51) Int. Cl.
  *H01Q 1/40* (2006.01)
  *H01Q 21/00* (2006.01)
  *H01Q 21/06* (2006.01)
  *G01S 13/88* (2006.01)

(52) U.S. Cl.
  CPC ..... *H01Q 21/0012* (2013.01); *H01Q 21/0031* (2013.01); *H01Q 21/064* (2013.01); *H01Q 21/0025* (2013.01)

(58) Field of Classification Search
  CPC .......... H01Q 13/22; H01Q 1/52; H01Q 1/521; H01Q 1/523
  See application file for complete search history.

(56) References Cited

U.S. PATENT DOCUMENTS

| | | | | |
|---|---|---|---|---|
| 4,821,044 A | * | 4/1989 | Kurtz | H01Q 21/005 343/771 |
| 4,916,457 A | * | 4/1990 | Foy | H01Q 13/106 343/768 |
| 4,958,165 A | * | 9/1990 | Axford | H01Q 13/18 343/770 |
| 5,019,831 A | * | 5/1991 | Yee | H01Q 21/0043 343/770 |
| 5,025,264 A | * | 6/1991 | Stafford | H01Q 13/18 343/767 |
| 5,189,433 A | * | 2/1993 | Stern | H01Q 3/24 343/770 |
| 5,349,364 A | * | 9/1994 | Bryanos | H01P 5/12 333/116 |
| 5,446,471 A | * | 8/1995 | Chung | H01Q 13/18 343/767 |
| 5,541,612 A | * | 7/1996 | Josefsson | H01Q 21/0043 333/237 |
| 5,638,079 A | * | 6/1997 | Kastner | H01Q 13/22 343/768 |
| 5,726,666 A | * | 3/1998 | Hoover | H01Q 13/10 343/767 |
| 5,757,329 A | * | 5/1998 | Hoover | H01Q 13/18 29/600 |
| 5,977,924 A | * | 11/1999 | Takei | H01Q 21/068 343/700 MS |
| 5,982,256 A | * | 11/1999 | Uchimura | H01P 1/047 333/239 |
| 6,285,335 B1 | * | 9/2001 | Snygg | H01Q 21/0087 343/770 |
| 6,351,244 B1 | * | 2/2002 | Snygg | H01Q 1/246 343/770 |
| 6,489,930 B2 | * | 12/2002 | Teshirogi | H01Q 13/28 333/238 |
| 6,535,173 B2 | * | 3/2003 | Ou | H01Q 21/005 343/770 |
| 6,778,144 B2 | * | 8/2004 | Anderson | H01Q 13/106 343/767 |
| 6,972,727 B1 | * | 12/2005 | West | H01P 1/181 333/157 |
| 7,202,832 B2 | * | 4/2007 | Wang | H01Q 1/3275 343/711 |
| 7,808,439 B2 | * | 10/2010 | Yang | H01Q 13/22 343/771 |
| 8,040,286 B2 | * | 10/2011 | Matsuo | H01P 5/02 343/771 |
| 9,595,765 B1 | * | 3/2017 | Valayil | H01Q 15/0086 |
| 9,912,068 B2 | * | 3/2018 | Shijo | G01S 7/03 |
| 10,103,448 B1 | * | 10/2018 | Izadian | H01Q 21/0087 |
| 10,191,152 B2 | * | 1/2019 | Bunch | H01Q 1/281 |
| 2003/0067410 A1 | * | 4/2003 | Puzella | H01Q 9/0407 343/700 MS |
| 2004/0004576 A1 | * | 1/2004 | Anderson | H01Q 21/064 343/770 |
| 2004/0086249 A1 | | 5/2004 | Zoorob | |
| 2005/0017905 A1 | * | 1/2005 | Rawnick | H01Q 1/38 343/700 MS |
| 2005/0104793 A1 | * | 5/2005 | Yuanzhu | H01Q 13/10 343/770 |
| 2005/0162328 A1 | * | 7/2005 | Mori | H01Q 13/10 343/770 |
| 2006/0132374 A1 | * | 6/2006 | Wang | H01Q 1/3275 343/770 |
| 2006/0164315 A1 | * | 7/2006 | Munk | H01Q 21/28 343/776 |
| 2008/0266195 A1 | * | 10/2008 | Yamaguchi | H01Q 21/0043 343/771 |
| 2010/0001916 A1 | * | 1/2010 | Yamaguchi | H01Q 21/005 343/771 |
| 2010/0321265 A1 | * | 12/2010 | Yamaguchi | H01Q 21/0043 343/771 |
| 2012/0056776 A1 | * | 3/2012 | Shijo | H01Q 13/22 342/146 |
| 2012/0068900 A1 | * | 3/2012 | Yatabe | H01Q 13/10 343/767 |
| 2012/0287006 A1 | * | 11/2012 | Lenormand | H01Q 21/005 343/771 |
| 2013/0313328 A1 | * | 11/2013 | Mohajer-Iravani | H01Q 13/18 235/492 |
| 2015/0222021 A1 | * | 8/2015 | Stevenson | H01Q 21/005 343/771 |
| 2015/0222023 A1 | * | 8/2015 | Shijo | G01S 7/03 342/195 |
| 2015/0229027 A1 | * | 8/2015 | Sonozaki | H01Q 13/22 343/771 |
| 2016/0036131 A1 | * | 2/2016 | Kim | H01Q 21/0037 343/771 |
| 2016/0079677 A1 | * | 3/2016 | Denis | B23K 37/00 228/18 |
| 2017/0040686 A1 | * | 2/2017 | Gilchrist | H01Q 15/006 |
| 2017/0133756 A1 | * | 5/2017 | Eastburg | H01Q 9/0407 |
| 2017/0346169 A1 | * | 11/2017 | Wang | G01S 13/4463 |
| 2018/0159227 A1 | * | 6/2018 | Hino | H01Q 13/18 |
| 2018/0254563 A1 | * | 9/2018 | Sonozaki | H01Q 21/0062 |
| 2018/0294576 A1 | * | 10/2018 | Niakan | H01Q 13/103 |

OTHER PUBLICATIONS

Lipworth et al., "Comprehensive Simulation Platform for a Metamaterial Imaging System" Applied Optics; Research Article, vol. 54, Issue 31, Nov. 1, 2015, 11 pages.

International Search Report and Written Opinion issued in PCT Application No. PCT/US2016/061802 dated Mar. 27, 2017, 8 pages.

International Preliminary Report on Patentability and Written Opinion issued in counterpart PCT Application No. PCT/US2016/061802 dated May 15, 2018 (seven (7) pages).

* cited by examiner

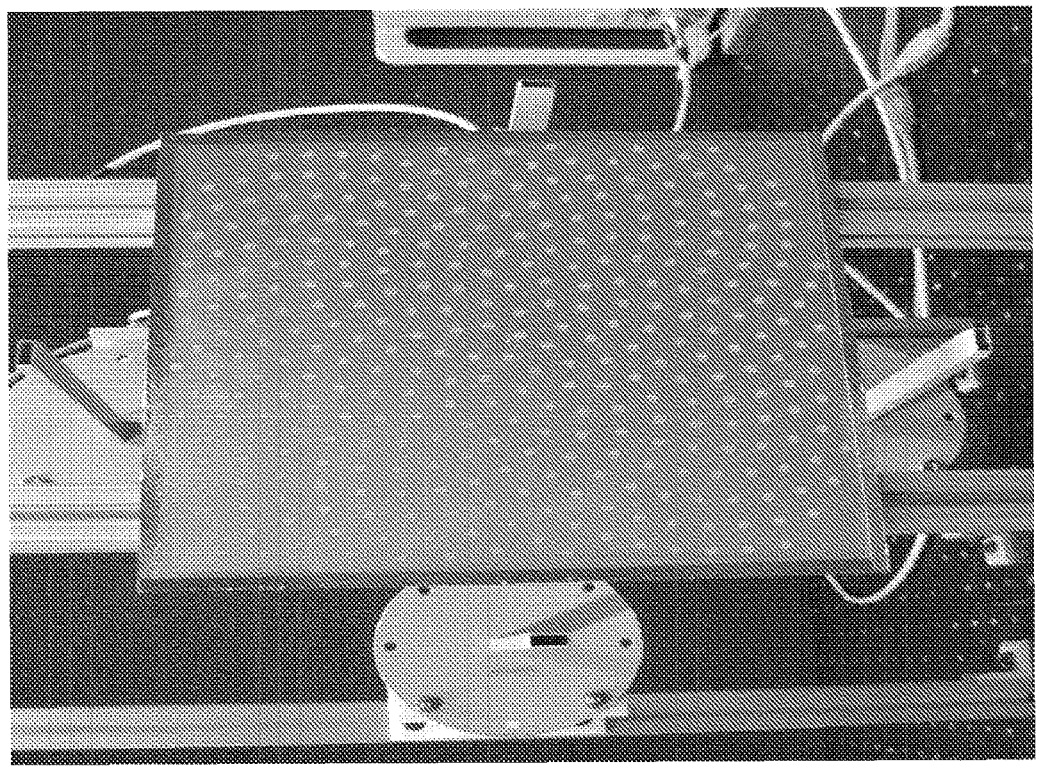
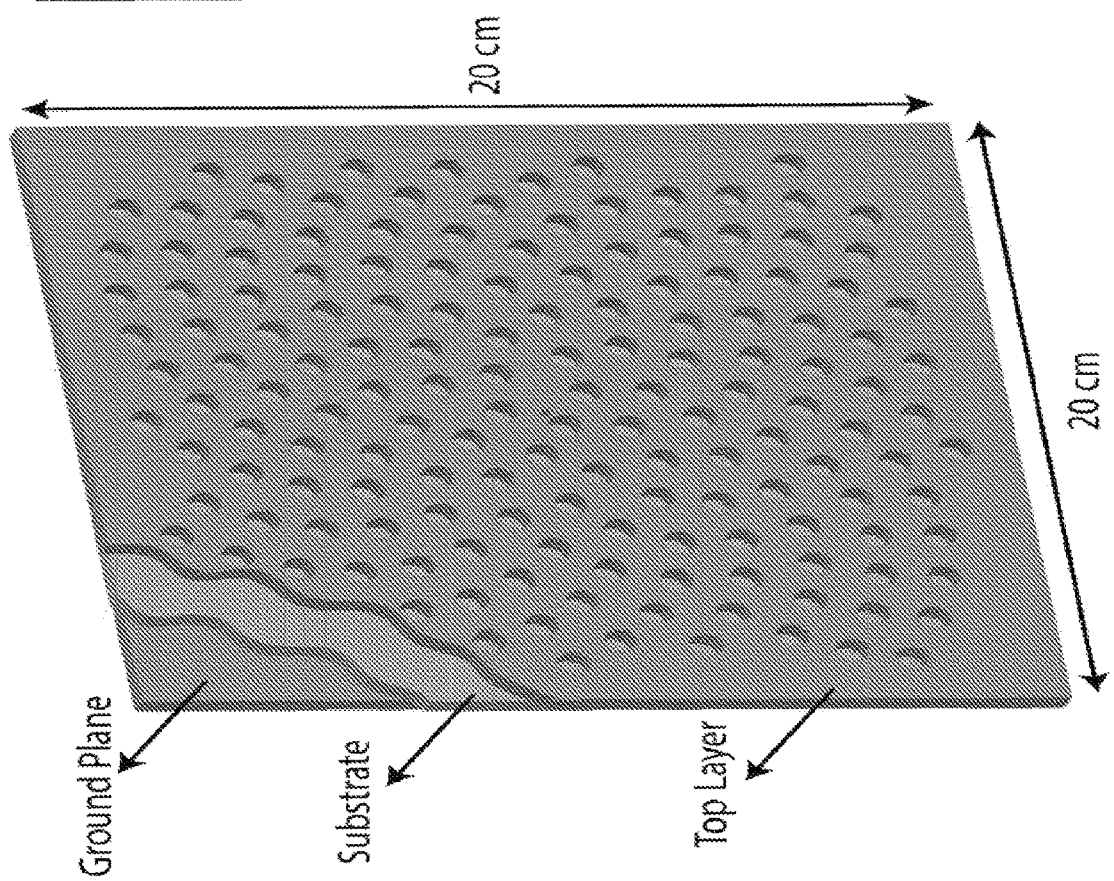
FIG. 1A
FIG. 1B

PRINTED CAVITIES FOR COMPUTATIONAL MICROWAVE IMAGING AND METHODS OF USE

CROSS REFERENCE TO RELATED APPLICATION

This is a 371 national stage patent application, which claims priority to PCT International Patent Application No. PCT/US2016/061802, filed Nov. 14, 2016, and titled PRINTED CAVITIES FOR COMPUTATIONAL MICROWAVE IMAGING AND METHODS OF USE, which claims the benefit of and priority to U.S. Provisional Patent Application No. 62/254,272, filed Nov. 12, 2015 and titled PRINTED APERIODIC CAVITY FOR COMPUTATIONAL MICROWAVE IMAGING AND METHODS OF USE, the disclosures of which are incorporated herein by reference in their entireties.

STATEMENT AS TO FEDERALLY SPONSORED RESEARCH

This invention was made with the support of the United States government under Federal Grant No. HSHQDC-12-C-00049, entitled "Metamaterial Transceiver Based Compressive RF Imaging System" and awarded by the Department of Homeland Security. The government has certain rights in the invention.

TECHNICAL FIELD

The presently disclosed subject matter relates to microwave imaging. Particularly, the presently disclosed subject matter relates to systems and methods for printed cavities for computational microwave imaging and methods for use.

BACKGROUND

The detection and imaging of objects using microwaves is of importance in a number of areas, but especially in security-screening applications. A practical imaging system should be fast and accurate. Typical imaging methods, such as synthetic aperture radar (SAR), holography and phased arrays, have been explored extensively, but often are limited by constraints in regards to imaging speed or cost.

For SAR imaging, an aperture is mechanically synthesized using a transceiver antenna, which is rastered in front of a scene. SAR measurements provide very orthogonal sampling of the imaging scene and a relatively simple mechanical and radio frequency (RF) hardware configuration. However, the mechanical scan requirement is time consuming and can limit usefulness of SAR for real-time applications.

Holography involves introducing a coherent reference signal for imaging. The scattered field phase is retrieved from low-cost amplitude-only measurements, removing the requirement of using expensive vector measurement equipment. However, similar to SAR techniques, the scanning aperture is synthesized by use of a raster scan, which is generally slow.

Alternatively, one can use phased array antennas configured to produce electronically scanned beams to interrogate the imaging scene in fast succession. However, this is achieved at a substantial increase in the circuit complexity, power consumption, and cost.

One way to overcome these challenges is to use computational imaging techniques that harness frequency diverse apertures. These techniques rely on producing frequency-dependent complex patterns (or modes) to encode the scene information and involves using metamaterial panels having complementary-ELC (cELC) elements with randomly distributed resonance frequencies over the K-band (18-26.5 GHz). However, these panels have thousands of sub-wavelength unit cells, making them difficult to fabricate and sensitive to fabrication tolerances. Moreover, they exhibit high dielectric and conduction losses, which limits the radiation efficiency and the obtainable mode diversity. The correlation between mode diversity and system loss is encapsulated in the quality factor (Q) of the system. A higher Q panel statistically allows access to more orthogonal modes and allows the scene to be encoded within less measurements (reduced information redundancy). Air-filled mode-mixing chaotic cavity with high Q-factor and radiation efficiency have been developed. However, the mode-mixing cavity has a multi-wavelength thickness supporting a complex mixture of higher order modes which are not amenable to direct analytic prediction. In addition, such a design cannot be employed in imaging systems where flat panels are required.

BRIEF SUMMARY

Disclosed herein are systems and methods for printed cavities for computational microwave imaging and methods of use. According to an aspect, an imaging system includes a printed cavity having a layer having a first surface and a second surface. The printed cavity defines multiple apertures that extend between the first surface and the second surface. The printed cavity also includes a substrate being attached to the first surface of the layer. The substrate is also configured to be fed a guided wave that excites the apertures to produce a radiation pattern for illuminating a scene. The imaging system also include one or more antennas configured to generate a signal for imaging based on the illuminated scene.

BRIEF DESCRIPTION OF THE SEVERAL VIEWS OF THE DRAWINGS

The foregoing aspects and other features of the present subject matter are explained in the following description, taken in connection with the accompanying drawings, wherein:

FIG. 1A is a perspective view of an example printed cavity in accordance with embodiments of the present disclosure;

FIG. 1B is an image of an example set-up of the printed cavity in accordance with embodiments of the present disclosure;

DETAILED DESCRIPTION

Figure 2:
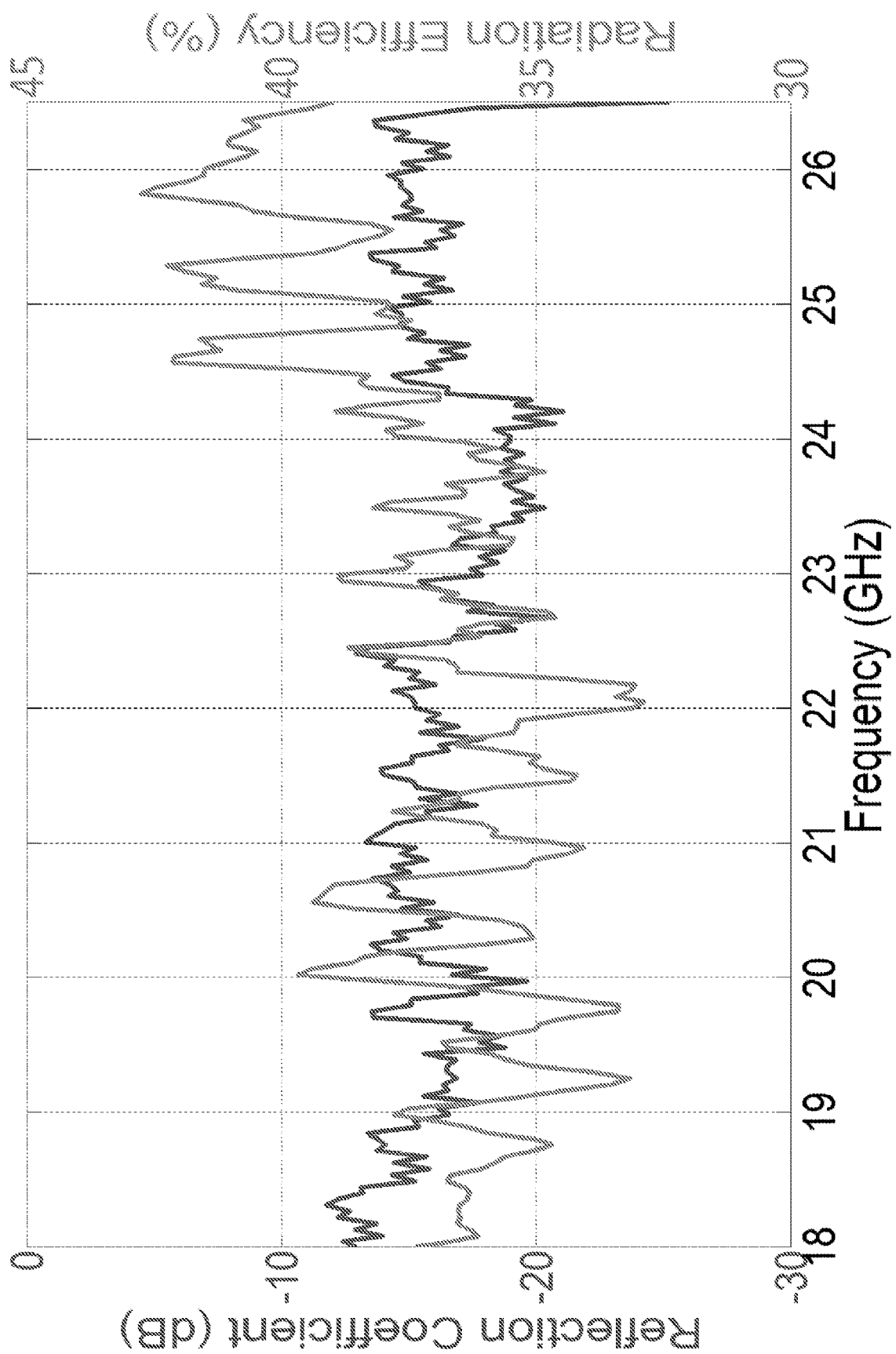
FIG. 2 shows measured $S_{11}$ and radiation efficiency patterns of a printed cavity in K-band frequency range in accordance with embodiments of the present disclosure.

For the purposes of promoting an understanding of the principles of the present disclosure, reference will now be made to various embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "an element" means at least one element and can include more than one element.

Unless otherwise defined, all technical terms used herein have the same meaning as commonly understood by one or ordinary skill in the art to which this disclosure belongs.

In accordance with embodiments, a printed cavity having an array of aperiodic circular irises (apertures or holes) for imaging in the K-band is disclosed. In comparison to metamaterial panels, the printed cavity can be easier to fabricate, has better fabrication tolerances, provides superior radiation efficiency, supports polarimetric imaging, and provide an effective excitation for the circular irises, using the complete aperture. In comparison to the air-filled chaotic cavity, the printed cavity can provide the advantages of a planar structure, fabrication ease (due to printed circuit technology), and provide single mode operation in the broadside direction.

In accordance with embodiments, a frequency-diverse aperture for microwave imaging based on a planar cavity at K-band frequencies (18-26.5 GHz) is disclosed. The structure can include an array of radiating circular or rectangular irises (or apertures) patterned into the front surface of a double-sided printed circuit board. In accordance with embodiments, the irises are distributed in a Fibonacci pattern to maximize spatial diversity at the scene. Alternatively, the irises (or apertures) may be arranged in a Mills-Cross pattern, a Golay pattern, or any other suitable pattern. The printed cavity may be a phase-diverse system and may encode imaged scene information onto a set of frequencies that span the K-band. Similar to some metamaterial apertures, the printed cavity imager does not require mechanically moving parts or complex phase shifting networks. Imaging of a number of targets in accordance with these embodiments is provided herein. Such reconstructed images demonstrate the ability of the system to perform imaging at the diffraction limit. The proposed printed cavity imager can possess a relatively large quality factor that can be traded off to achieve higher radiation efficiency. The general mode characteristics of the printed cavity suggest advantages when used in computational imaging scenarios.

As referred to herein, the term "substrate" is a solid substance onto which a layer of another substance is applied, and to which the second substance attaches. As an example, a substrate may be a dielectric substrate. In another example, a substrate may be an air-filled substrate.

FIGS. 1A and 1B depict different views of an example printed cavity in accordance with embodiments of the present disclosure. Particularly, FIG. 1A illustrates a perspective view of the printed cavity. FIG. 1B is an image of an example set-up of the printed cavity. The cavity shown in FIGS. 1A and 1B includes a double-sided copper clad circuit board (Rogers 4003 substrate, $\varepsilon_r$=3.55 and $\tan\delta$=0.0027) with copper tape wrapping the edges to form the cavity structure. The top structure of the cavity is patterned with an array of circular irises distributed in a Fibonacci pattern. The thickness of the substrate is 1.524 mm, smaller than the half guided-wavelength, $\lambda_g/2$, such that higher order cavity modes are beyond cutoff at K-band frequencies. The printed cavity is center-fed with a single coaxial feed launching a cylindrical guided wave into the dielectric substrate, described by the Hankel function of the second kind, $H_0^{(2)}$. In an example, the dielectric substrate is a Rogers 4003 dielectric substrate. This wave excites the circular irises, which act as non-resonant, broadband radiators that collectively produce a radiation pattern illuminating the scene.

The iris size can play an important role in determining the metrics of the aperture as an imaging device. Larger diameter irises can exhibit greater coupling to the guided wave and thus produce higher radiation efficiencies. This radiation efficiency can result in superior signal-to-noise ratio (SNR) levels for imaging, assuming the same input power to the feed. However, due to the increased radiation, larger iris sizes can reduce the Q-factor, increasing the correlation between measurement modes close in frequency. Lower Q-factors thus translate to fewer independent modes per frequency bandwidth, reducing the information content received from the scene. Changing the iris diameter of the printed cavity produces different ratios of (Q-factor/radiation efficiency), which can be selected to optimize a given imaging scenario.

For experiments disclosed herein, the printed cavity was used as the transmit aperture, with a set of four low-gain probes used as receive antennas. Since the probes have a high radiation efficiency but lack mode-diversity (i.e., have low Q-factor), it may be desirable to maximize the Q-factor of the printed cavity at the expense of reducing the radiation efficiency. With this goal in mind, simulations were performed using CST MICROWAVE STUDIO® software, a 3D EM emulation application available from CST Computer Simulation Technology AG of Framingham, Mass., for optimizing the iris diameter. A diameter of 4 mm ($\lambda_g/1.8$ at the center imaging frequency of 22 GHz) was found to provide the optimal mode diversity. The irises were patterned on the top copper surface of the circuit board using a laser printer (e.g., a ProtoLaser U3 available from LPKF Laser & Electronics). The Q-factor of the printed cavity was determined experimentally from the signal decay factor observed in the measured time-domain reflection coefficient ($S_{11}$) pattern. For radiation efficiency measurements, a near-field scan of the cavity was performed using an NSI near-field scanning system. The measured Q-factor of the cavity was determined as Q=140, and the frequency-averaged radiation efficiency of the cavity found as η=37.1%, averaged over the K-band. FIG. 2 shows the measured $S_{11}$ and radiation efficiency patterns of the printed cavity in K-band frequency range.

The Q-factor of the cavity determines the number of unique measurement modes over the frequency bandwidth, thus setting the number of frequency sampling points for the near-field scan. Given the imaging bandwidth, B=8.5 GHz, the frequency sampling interval limit can be calculated as $\Delta f \approx B/Q$=60.7 MHz.

Sampling the frequency bandwidth at $\Delta f$ results in a maximum number of distinct measurement modes. Sampling intervals greater than $\Delta f$ reduce the number of measurement modes, losing information and reducing the potential resolution of the aperture. Sampling at intervals smaller than $\Delta f$ results in redundant information being acquired. For the experiments, the near-field scan of the cavity was performed using 201 frequency sampling points, resulting in $\Delta f$=42.5 MHz across the K-band, slightly oversampling the aperture. Thus, the fabricated cavity imager has approximately M=804 total number of measurement modes calculated as cavity number (1)×probe number (4)×frequency sampling points (201). The measured signal is correlated to the scene reflectivity through the first Born approximation, which results in the linear system described by the relation:

$$g_{M \times 1} = H_{M \times N} f_{N \times 1} \qquad (1)$$

In equation (1), g is the measurement vector (size M×1, where M is the number of measurement modes), H is the measurement matrix (size M×N, where N is the number of cubic voxels into which the imaging scene is discretized) and f is the scene reflectivity vector (size N×1). The measurement matrix H is the product of the cavity and probe fields, $E_{i,j}^{Tx}$ and $E_{i,j}^{Rx}$ (taken at position $r_j$ and frequency $f_i$), respectively, both of which are projected to the imaging scene. Recovering the estimate of the scene vector f in Equation (1), $f_{est}$, is an inverse problem, which can be solved using a suitable computational algorithm. In examples provided herein, use is made of matched-filter, least-squares, and two-step iterative shrinkage/thresholding (TwIST) technique with total variation (TV) algorithms.

In experiments, an imaging setup included a 20 cm×20 cm transmitting printed cavity and four WR-42 low-gain receiving probe antennas. The cavity was fed using the first port of a vector network analyzer (e.g., a VNA N5245 provided by Agilent Technologies). The receiving probes were connected to the second port of the VNA through a suitable multiport coaxial switch (e.g., a Keysight L7106 switch). The configuration shown in FIG. 1B was used for imaging a number of targets, including a 2 cm resolution target, a gun phantom, and a multi-range target including two L-shaped phantoms. The gun phantom and the resolution target were placed at d=50 cm from the cavity, while the L-shaped phantoms were placed a distance of 45 cm-50 cm away from the cavity, 2 cm apart from each other in range (x-axis). The imaging scenes including the imaged targets were discretized into cubic voxels of 5 mm size, which is smaller than the half-wavelength over the K-band, resulting in a total number of voxels N=10,000. The reconstructed images are shown in FIGS. 3A-3C with the photographs of the objects in the insets.

Figures 3A, 3B:
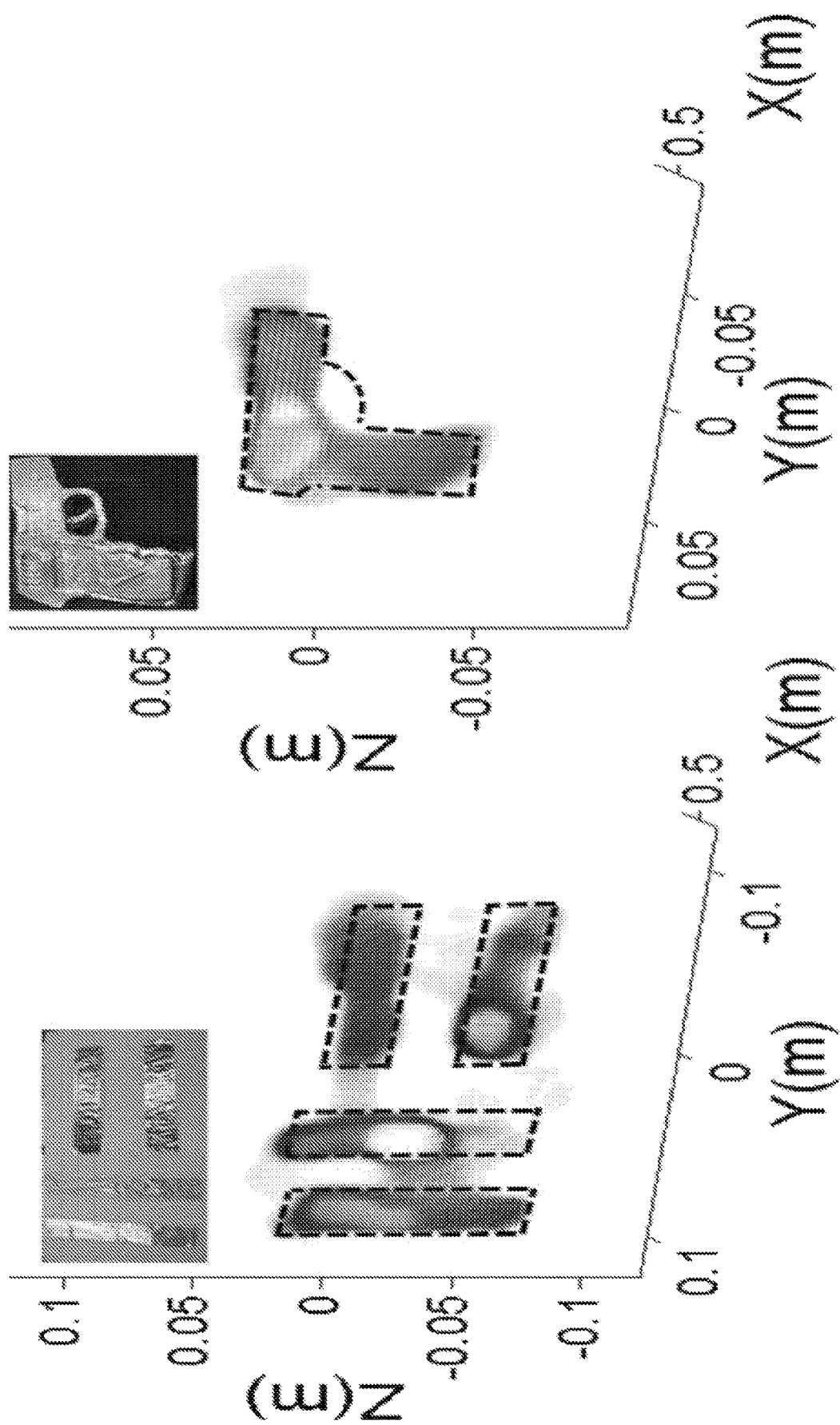
FIG. 3A is a reconstructed image showing a 2 centimeter resolution target.
FIG. 3B is a reconstructed image showing a gun phantom.
Figure 3C:
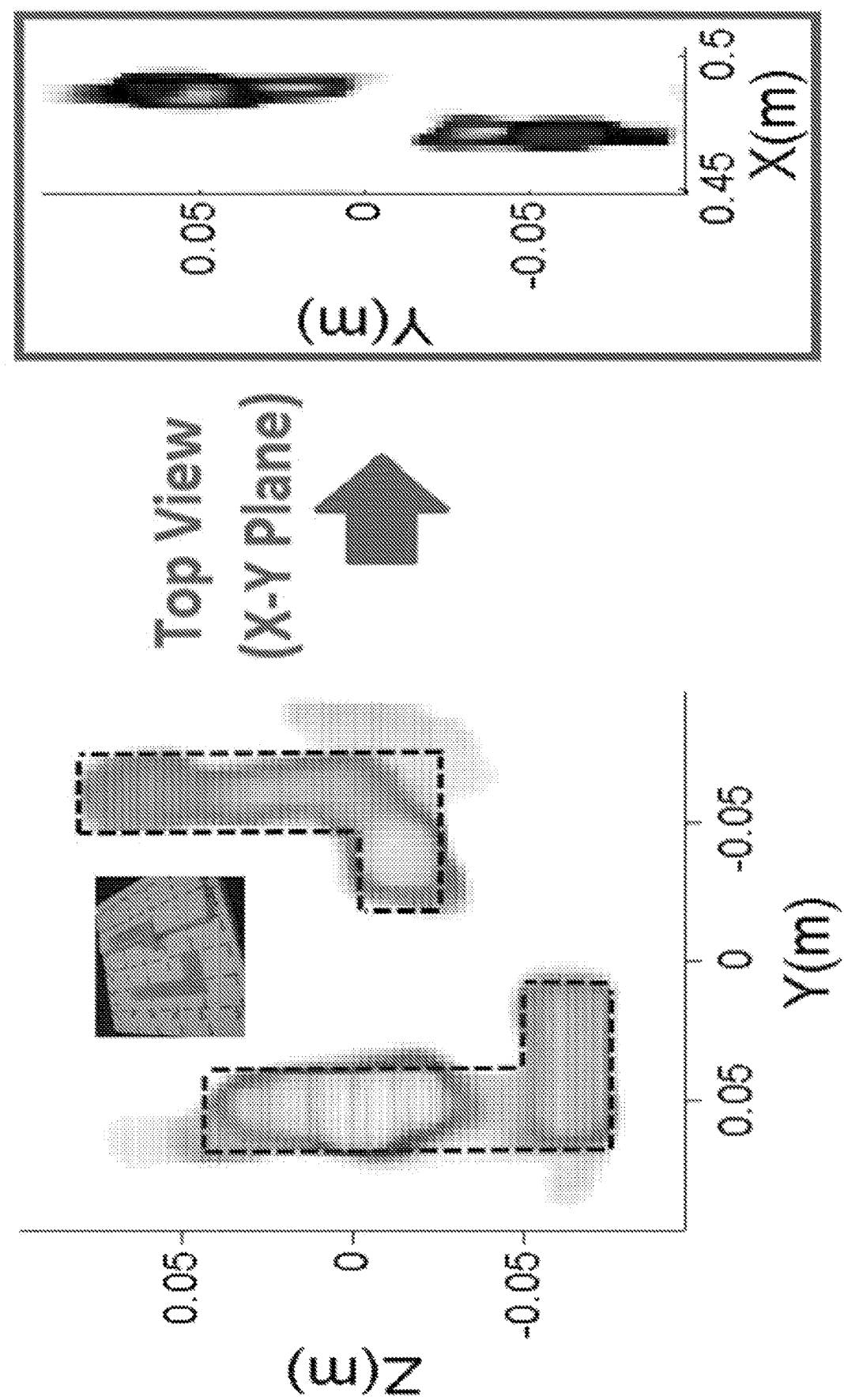
FIG. 3C are reconstructed images showing multi-range L-shaped phantoms.

The reconstructed image of the 2 cm resolution target shown in FIG. 3A demonstrates that the cavity imager supports imaging at the diffraction limit (cross-range resolution in y-z plane, $\delta_{cr}$=1.7 cm). As shown in FIG. 3B, the actual online outline of the imaged gun phantom is in good agreement with the reconstructed image. Given the range-resolution (along the x-axis) of the cavity imager determined by the imaging bandwidth, $\delta_{cr}$=1.76 cm, a clear discrimination between the L-shaped phantoms in depth was achieved as shown in FIG. 3C.

Figure 4:
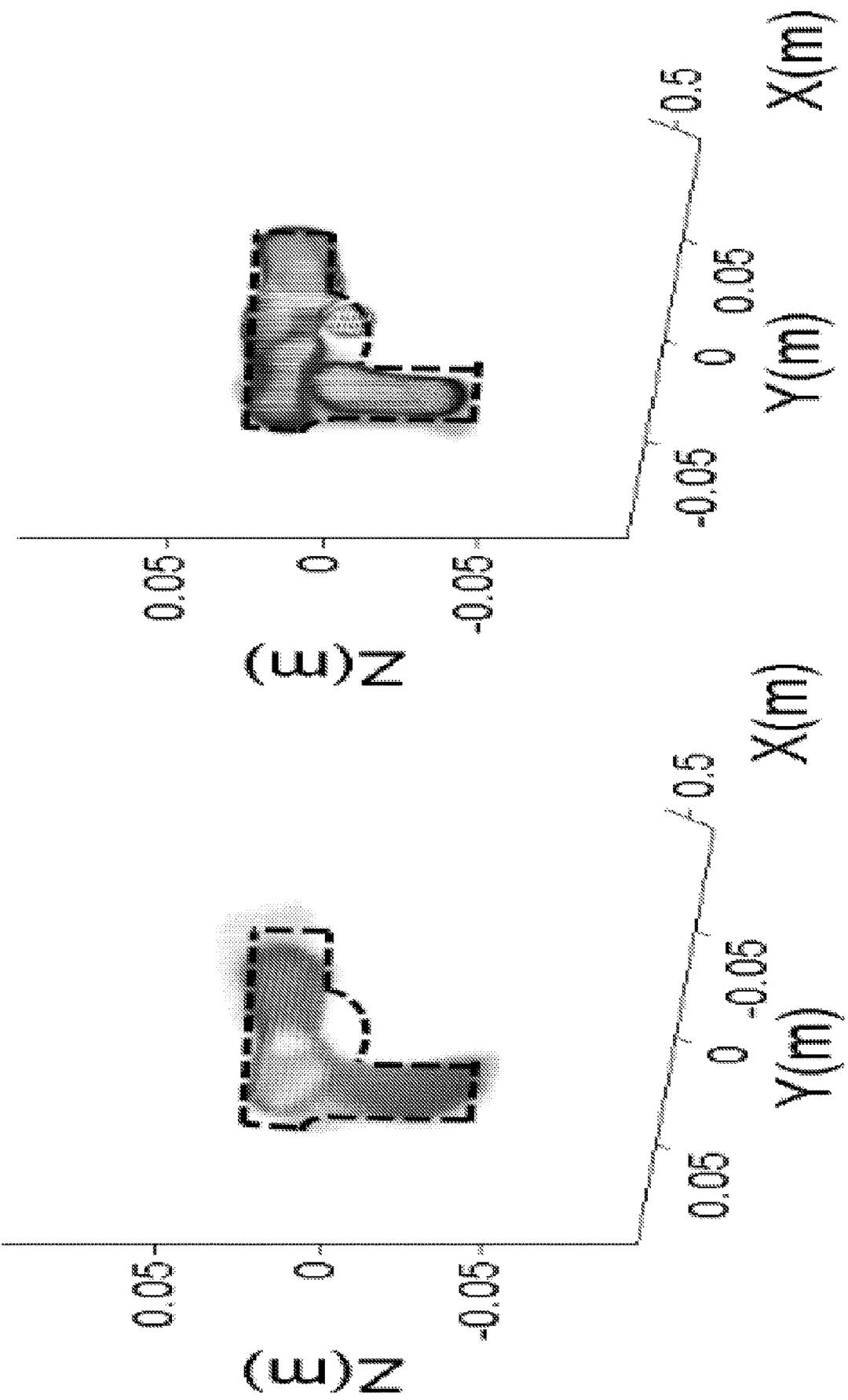
FIG. 4 are reconstructed images showing an experiment (left side) and a simulation (right side)

In order to obtain more quantitative comparisons, the aperture and scene were modeled using a custom code written in MATLAB® computational software available from MathWorks. To model the aperture, the near-field scans of the printed cavity were imported into the software and converted to a set of equivalent dipoles. The fields may then be propagated to build the measurement matrix. The scene objects were modeled as reflective voxels, and the measurement vector subsequently computed assuming the first Born approximation. In FIG. 4, the reconstructed image of the gun phantom is compared to the experimentally reconstructed image, revealing good agreement.

Analyzing FIGS. 1A and 1B, it can be seen that the radiating irises of the printed aperiodic cavity are distributed across the full-aperture. This results in overlapping sampling of the Fourier components as the imaging frequency is swept, collecting redundant information from the imaging scene.

The transmitting and receiving apertures used in a frequency-diverse imaging system should satisfy certain criteria in order to leverage the computational imaging concept to the full extend. It may be desirable in a frequency-diverse imaging system that the transmitting and receiving apertures maximize the spatial coverage (effective aperture) pattern. This enables the aperture pair to maximize the sampled Fourier components, extending the Fourier domain (k-space) support, which is required to optimize the imaging resolution. Moreover, it may also be important to reduce the sampling redundancy of the Fourier components, minimizing the correlation of the information collected from the imaging scene as a function of frequency. Minimization of the sampling redundancy can be achieved by choosing optimum aperture patterns producing non-overlapping radiated fields within the imaging domain. Using frequency-diverse apertures with the radiating elements distributed across the full-aperture (FIGS. 1A and 1B) brings three disadvantages; first, a poor effective aperture pattern, second, redundant sampling of the Fourier components, and third, a reduced Q-factor. Since the Q-factor statistically determines the orthogonality of the frequency measurement modes, the aperture should be optimized to minimize the number of radiating elements while maximizing the k-space support.

In order to address this challenge, planar cavity apertures with sparse complementary radiating irises forming a Mills-Cross pattern for a given transmitting and receiving aperture pair were developed. As a result of employing the Mills-Cross distribution for the radiating irises, the effective aperture is optimized, maximizing the number of the frequency components sampled in the k-space while reducing the sampling redundancy. Moreover, the mode diversity is significantly improved in comparison to the frequency-diverse apertures consisting of radiating elements distributed across the full-aperture.

The fabricated aperiodic printed Mills-Cross cavity apertures are shown in FIGS. 5A-5F. In this example, the Mills-Cross cavity has two different versions. The first version includes circular irises and exhibits dual-polarized polarimetric radiation. The second version, on the other hand, includes linear-polarized slot irises and radiates in single polarization. The Q-factor and the radiation efficiency of the Mills-Cross cavities were measured to be Q=330 and η=45%, respectively.

Figures 5A, 5B:
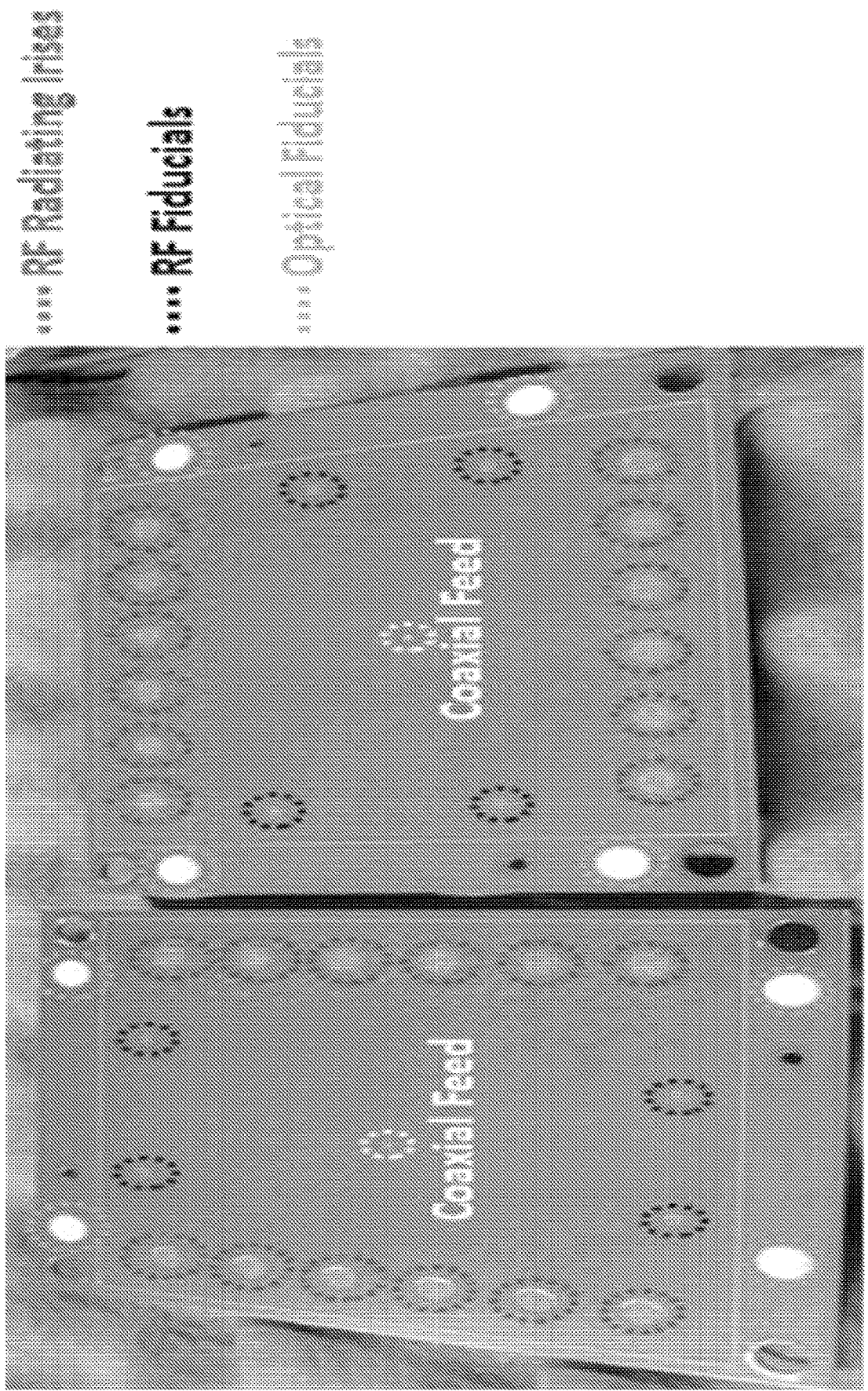
FIG. 5A is an image of an example transmit aperture in accordance with embodiments of the present disclosure.
FIG. 5B is an image of an example receive aperture in accordance with embodiments of the present disclosure.
Figure 5C:
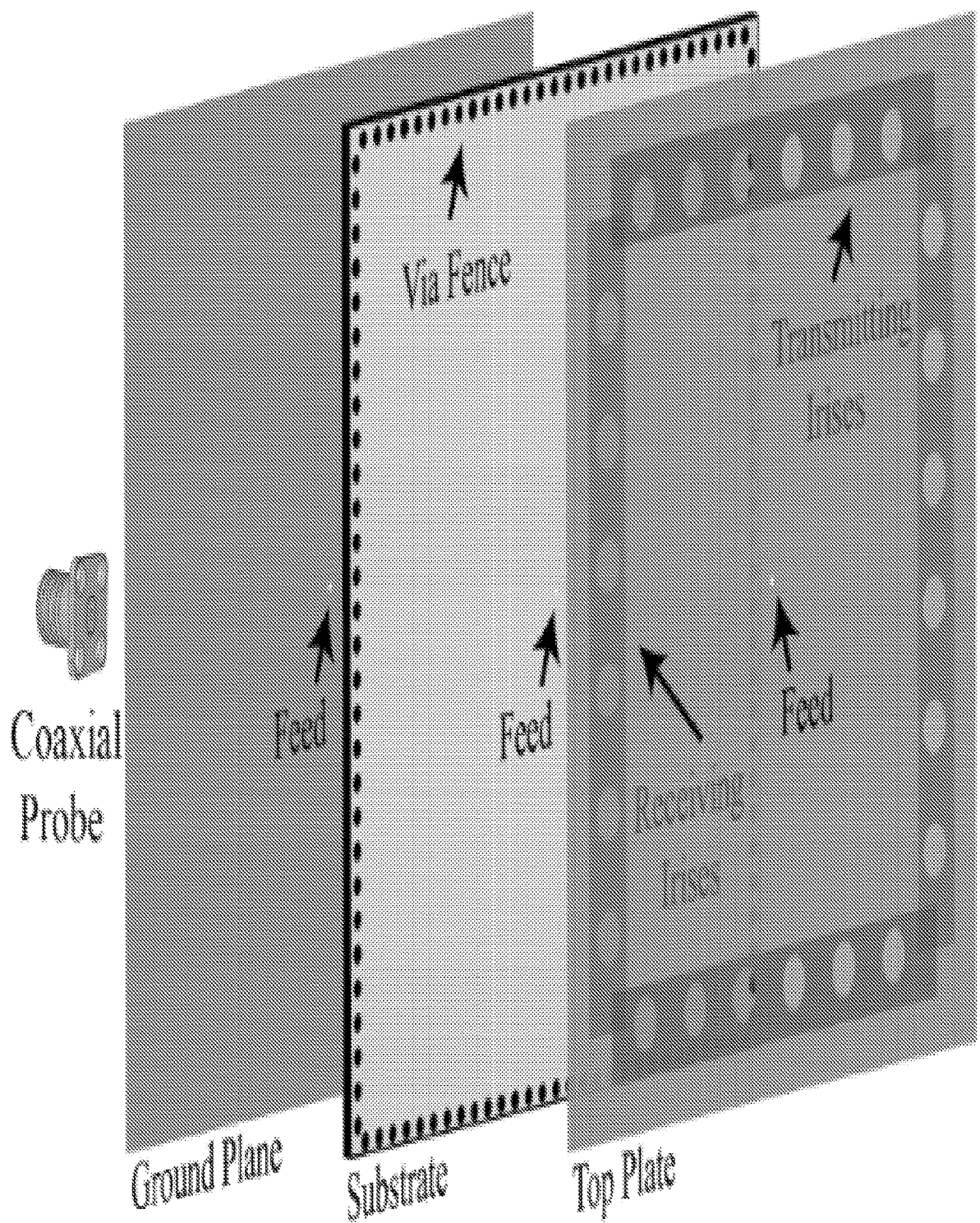
FIG. 5C is a schematic of example dual-polarized (polarimetric) Mills-Cross apertures (a single polarized version) in accordance with embodiments of the present disclosure.
Figures 5D, 5E:
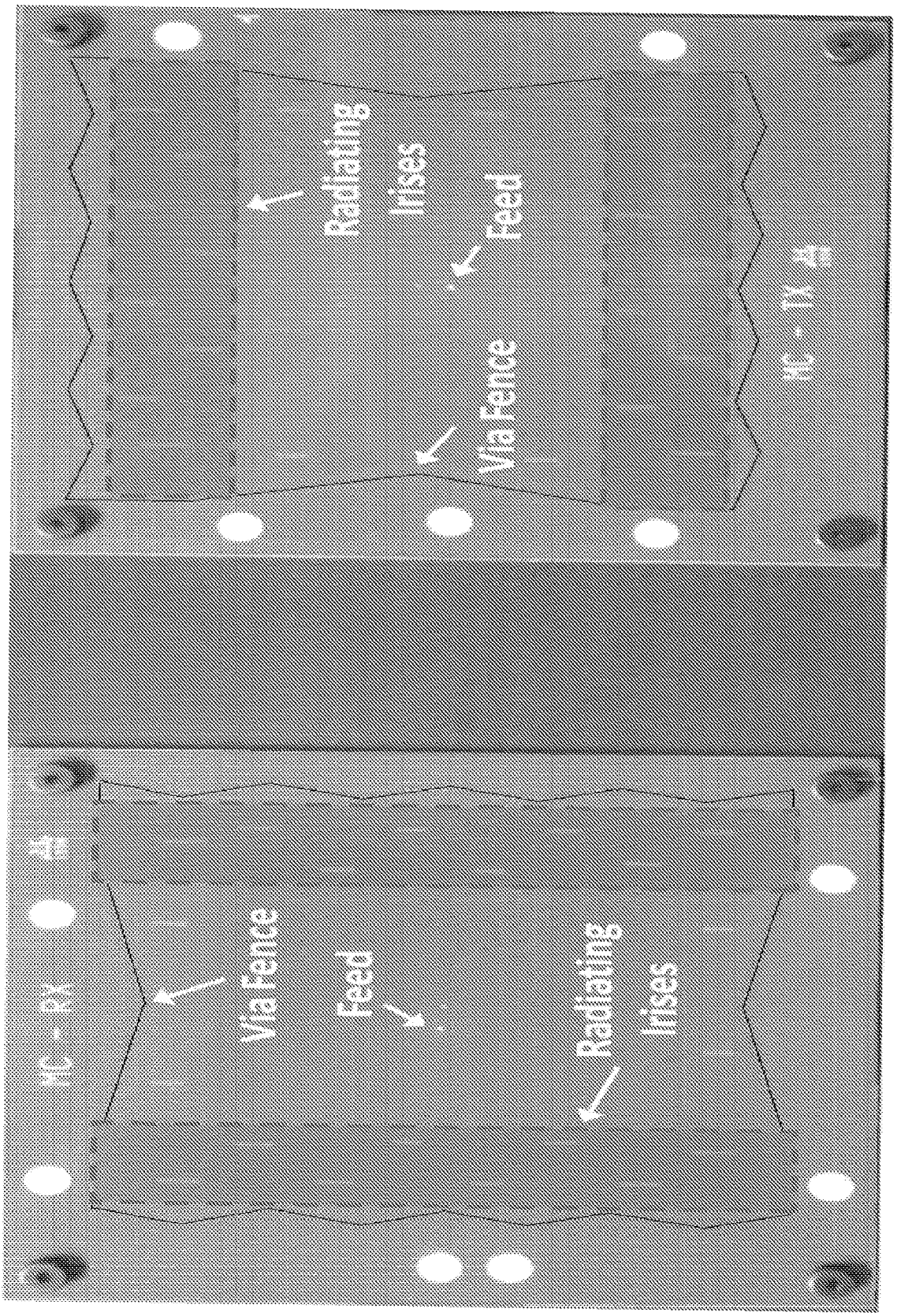
FIG. 5D is an image of a top view of an example receive aperture in accordance with embodiments of the present disclosure.
FIG. 5E is an image of a top view of an example transmit aperture in accordance with embodiments of the present disclosure.
Figure 5F:
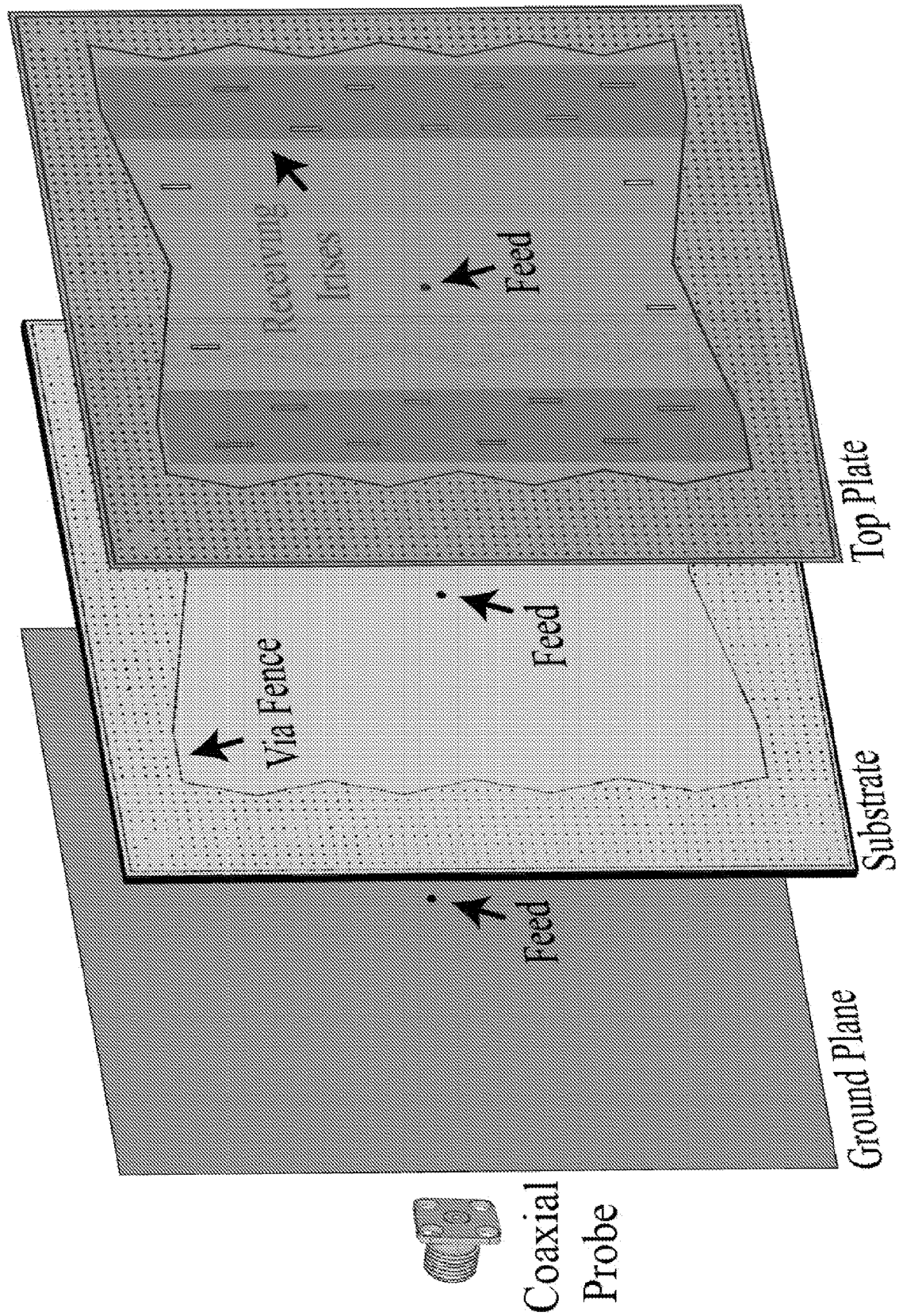
FIG. 5F is a schematic of an example single-polarized receive Mills-Cross aperture in accordance with embodiments of the present disclosure.
Figure 5G:
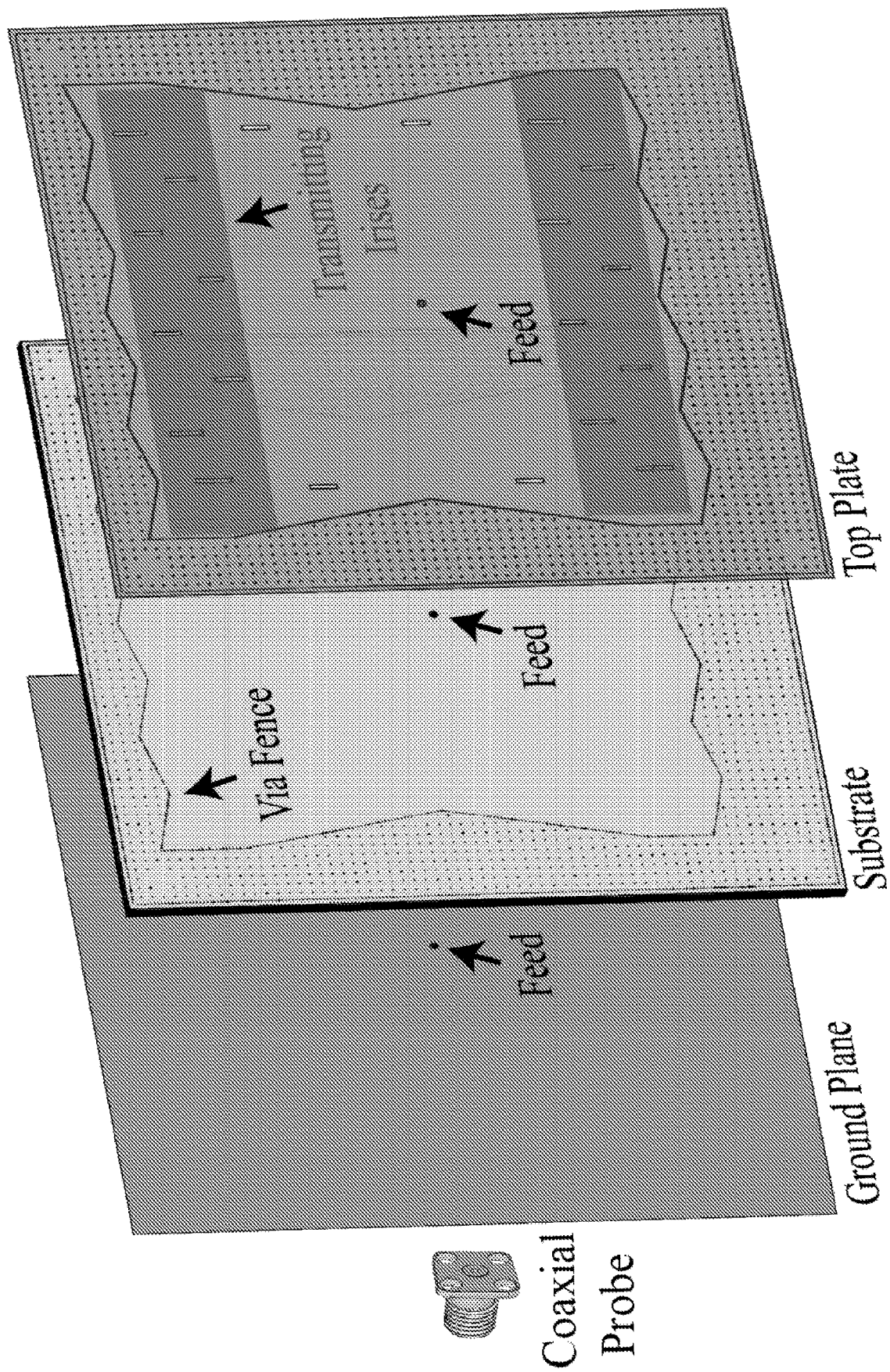
FIG. 5G is a schematic of an example single-polarized transmit Mills-Cross aperture in accordance with embodiments of the present disclosure.

FIG. 5A is an image of an example transmit aperture. FIG. 5B is an image of an example receive aperture. FIG. 5C is a schematic of example dual-polarized (polarimetric) Mills-Cross apertures (a single polarized version) in accordance with embodiments of the present disclosure. FIG. 5D is an image of a top view of an example receive aperture in accordance with embodiments of the present disclosure. FIG. 5E is an image of a top view of an example transmit aperture in accordance with embodiments of the present disclosure. FIG. 5F is a schematic of an example single-polarized receive Mills-Cross aperture in accordance with embodiments of the present disclosure. FIG. 5G is a schematic of an example single-polarized transmit Mills-Cross aperture in accordance with embodiments of the present disclosure. The dielectric substrate may be a Rogers 3003 substrate or any other suitable type of dielectric substrate.

Figure 6:
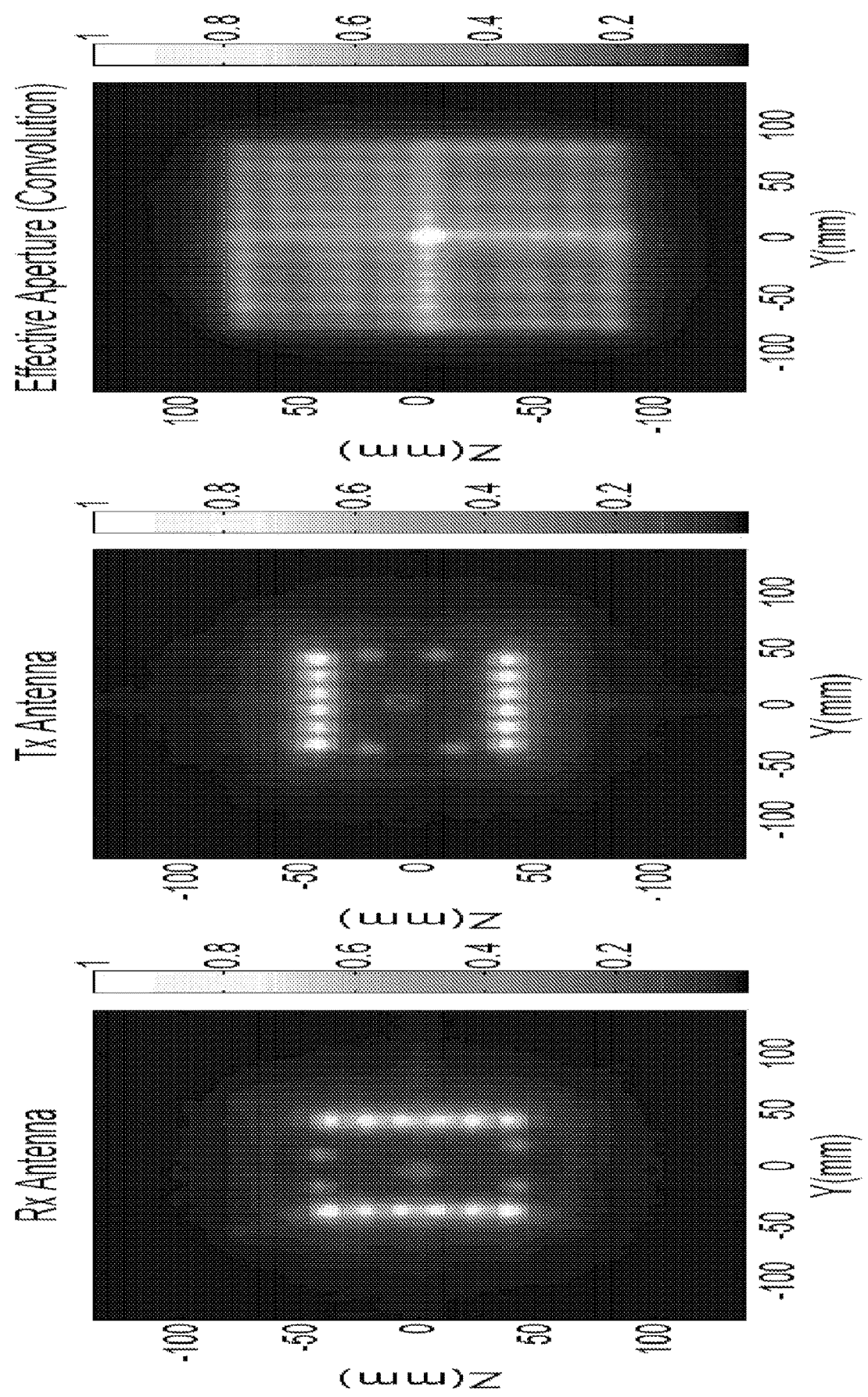
FIG. 6 are graphs showing back-propagated patterns and effective aperture distribution for transmit and receive apertures according to embodiments of the present disclosure.

Comparing the Mills-Cross apertures with the printed aperiodic cavity shown in FIGS. 1A and 1B is important to visualize the improvement in the effective aperture pattern and the sampling redundancy achieved using the proposed Mills-Cross structure. FIG. 6 are graphs showing back-propagated patterns and effective aperture distribution for transmit and receive apertures according to embodiments of the present disclosure. FIG. 6 demonstrates the normalized (with respect to the most redundantly sampled Fourier component) power patterns superposed over the K-band and back-propagated to the aperture plane. In FIG. 6, all the radiating irises are clearly visible and the fiducial irises (for system alignment) exhibit weaker radiation (due to less coupling to the guided-wave) as a result of having a smaller size. As shown in FIG. 6, the use of the Mills-Cross pattern optimizes the effective aperture, maximizing the number of the Fourier components sampled in k-space while minimizing the sampling redundancy. Investigating the effective aperture (convolution) pattern in FIG. 6, it can be seen that in comparison to the most redundantly sampled component in the center, the components along the vertical and horizontal lines intersecting in the center are sampled twice less redundantly while the other components are sampled four times less redundantly.

Figure 7:
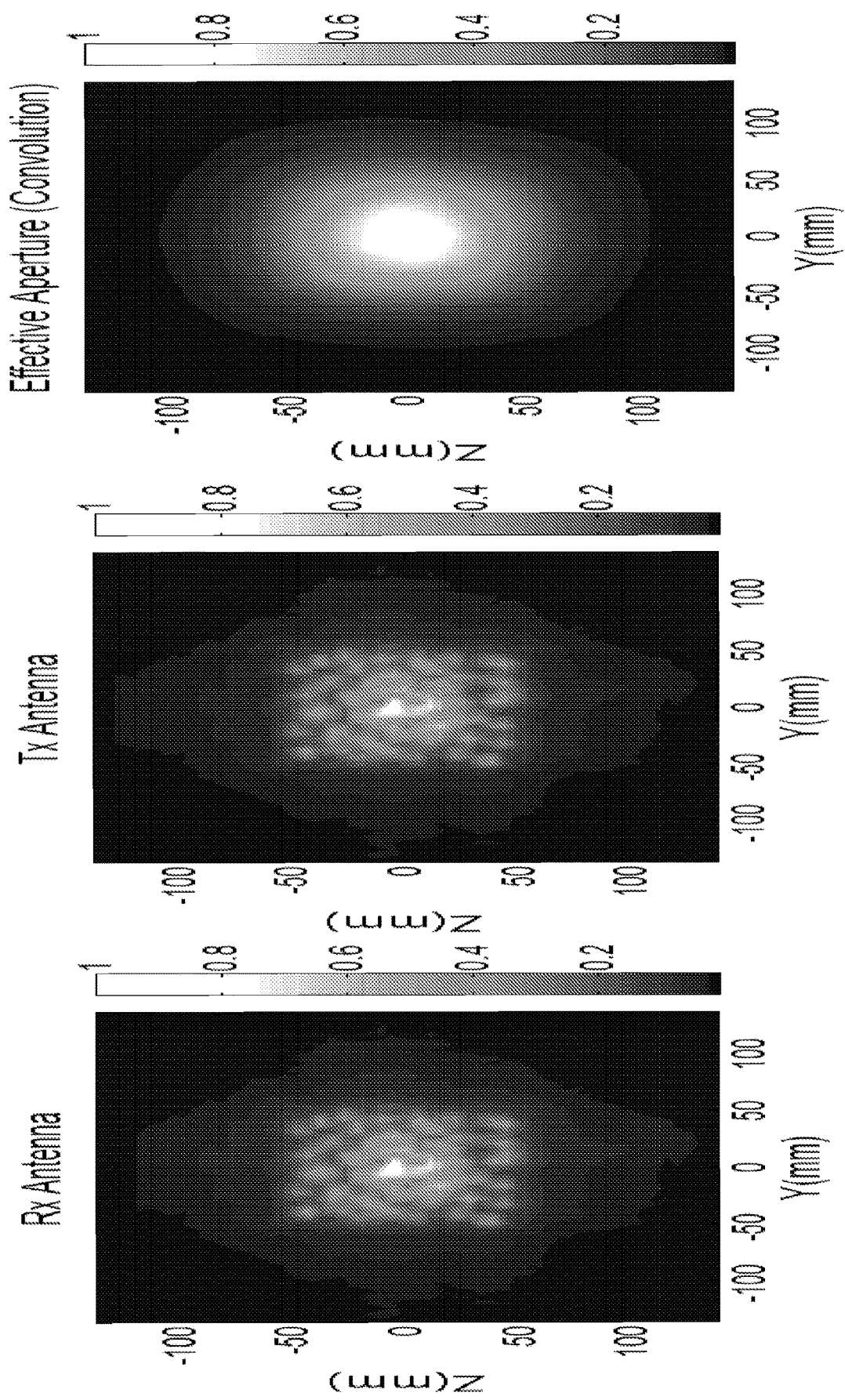
FIG. 7 are graphs showing back-propagated patterns and effective aperture distribution for non-optimized apertures with radiating irises or apertures distributed across the full-aperture according to embodiments of the present disclosure.

The back-propagated fields and the convolved effective aperture pattern of the non-optimized printed aperiodic cavity (shown in FIGS. 1A and 1B) are demonstrated in FIG. 7, which are graphs showing back-propagated patterns and effective aperture distribution for non-optimized apertures with radiating irises distributed across the full-aperture according to embodiments of the present disclosure. Similar to the study demonstrated for the Mills-Cross apertures in FIG. 6, the convolution pattern is normalized with respect to the most redundantly sampled component.

Comparing the effective aperture (convolution) patterns in FIGS. 6 and 7 reveals two important outcomes; first, the effective aperture pattern for the non-optimized apertures is smaller, suggesting that the number of the sampled Fourier components is reduced, and second, the sampling redundancy is significantly increased.

Figure 8:
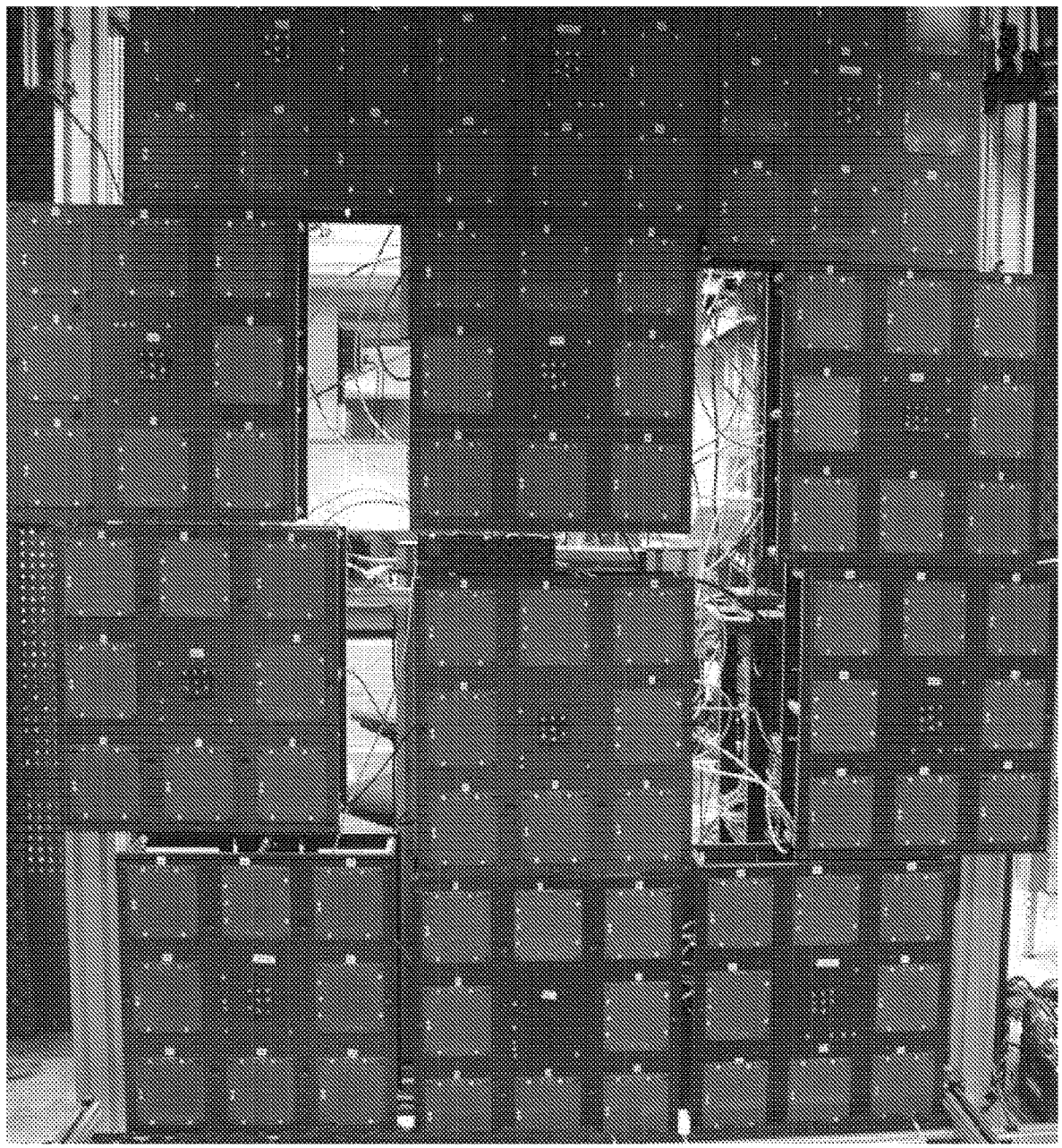
FIG. 8 is an image showing an experimental imaging system synthesized using printed aperiodic Mills-Cross apertures in accordance with embodiments of the present disclosure.

Using the printed aperiodic Mills-Cross apertures, an experimental system was synthesized as shown in FIG. 8. FIG. 8 is an image showing an experimental imaging system synthesized using printed aperiodic Mills-Cross apertures in accordance with embodiments of the present disclosure.

Figure 9:
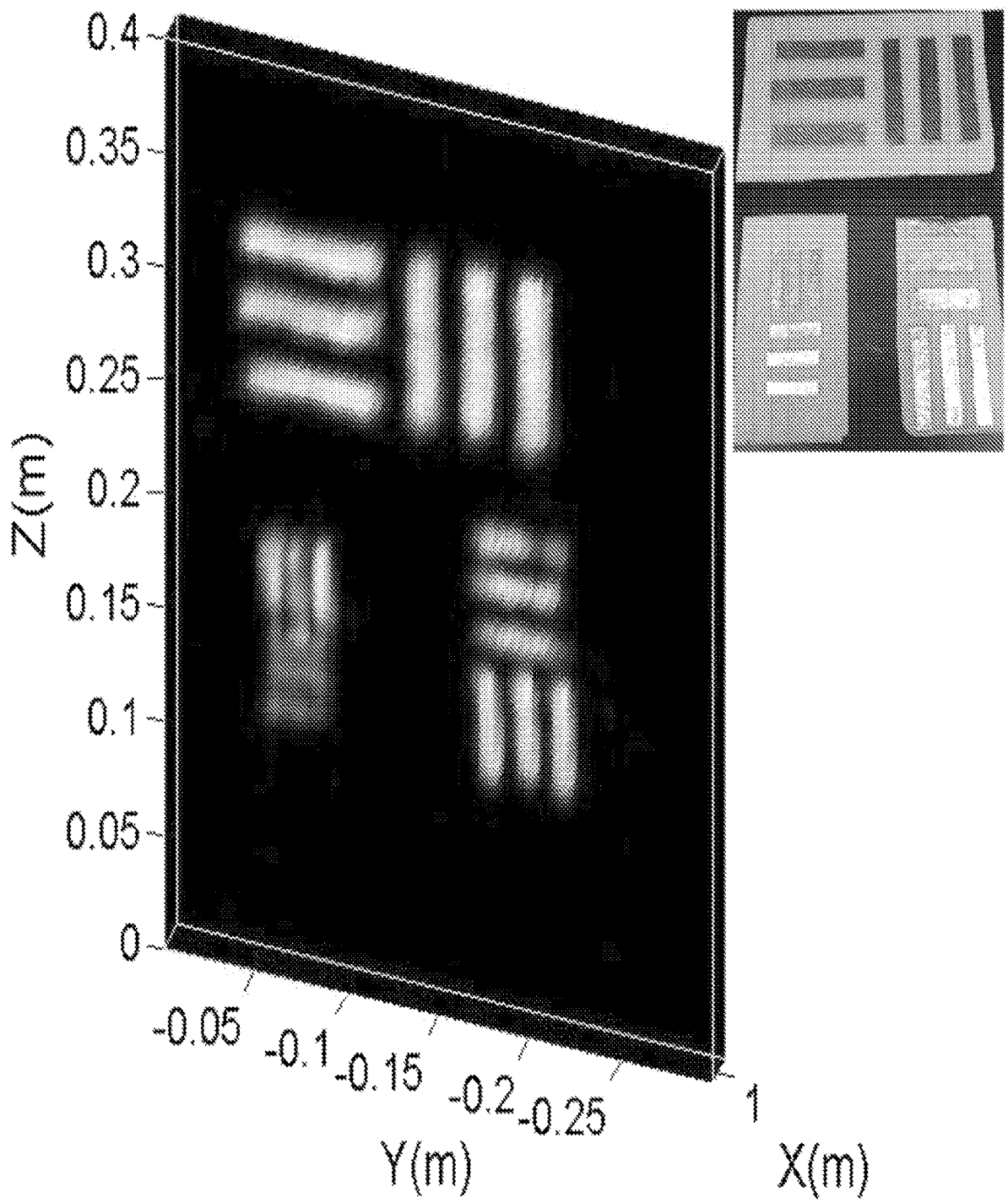
FIG. 9 illustrates images showing resolution targets reconstructed using the experimental system with the Mills-Cross apertures.

Using the synthesized imaging system, an object consisting of 0.7 cm, 1 cm and 1.5 cm resolution targets was imaged. The object was placed at a distance of d=1 m from the system. The reconstructed image is shown in FIG. 9, which illustrates images showing resolution targets reconstructed using the experimental system with the Mills-Cross apertures. As can be seen in FIG. 9, the reconstructed image reveals a clear outline of the resolution targets.

Demonstrated herein is a printed aperiodic cavity for 3D computational imaging. Building upon this structure, the Mills-Cross cavity design can improve the effective aperture pattern and the k-space sampling. The printed cavity is an efficient radiator, exhibits good mode diversity and supports imaging at the diffraction limit. As it relies on frequency diversity, the printed cavity avoids moving parts and phase shifters. Using the printed aperiodic and Mills-Cross cavity apertures, experimental imaging of a number of targets, including resolution targets, has been achieved.

Any patents or publications mentioned in this specification are indicative of the levels of those skilled in the art to which the present subject matter pertains. These patents and publications are herein incorporated by reference to the same extent as if each individual publication was specifically and individually indicated to be incorporated by reference.

One skilled in the art will readily appreciate that the present subject matter is well adapted to carry out the objects and obtain the ends and advantages mentioned, as well as those inherent therein. The present examples along with the methods described herein are presently representative of various embodiments, are exemplary, and are not intended as limitations on the scope of the present subject matter. Changes therein and other uses will occur to those skilled in the art which are encompassed within the spirit of the present subject matter as defined by the scope of the claims.

What is claimed is:

1. An imaging system comprising:
   a printed cavity comprising:
      a metal layer having a first surface and a second surface, and defining a plurality of receive apertures and a plurality of transmit apertures extending between the first surface and the second surface; and
      a substrate being attached to the first surface of the layer, and being configured to be fed a guided wave at a substantially central location between the receive apertures and transmit apertures that excites the apertures to produce a radiation pattern for illuminating a scene;
      a metal layer covering edges of the substrate and forming a perimeter spaced substantially equidistant from the central location for forming a cavity structure; and
      at least one antenna configured to generate a signal for imaging based on the illuminated scene.

2. The imaging system of claim 1, wherein the layer comprises copper.

3. The imaging system of claim 1, wherein the apertures are one of circular and rectangular in shape.

4. The imaging system of claim 1, wherein the apertures each have a diameter of a wavelength within the substrate divided by about 1.8.

5. The imaging system of claim 1, wherein the apertures each have a diameter of between about 2 millimeters and about 7 millimeters.

6. The imaging system of claim 1, wherein the substrate is one of a dielectric substrate and an air-filled substrate.

7. The imaging system of claim 1, wherein a number of the at least one antenna is 4.

8. The imaging system of claim 1, wherein the apertures are arranged in one of a Mills-Cross pattern, a Fibonacci pattern, and a Golay pattern.

9. The imaging system of claim 1, further comprising a coaxial probe and feed electrically connected to the substrate.

10. The imaging system of claim 1, further comprising a ground plane being attached to the substrate on a side of the substrate that opposes a side of the substrate attached to the layer.

11. The imaging system of claim 10, further comprising a coaxial probe and feed electrically connected to the substrate and the ground plane.

12. The imaging system of claim 10, wherein the ground plane comprises copper.

13. The imaging system of claim 1, wherein the substrate has first and second surfaces and a plurality of edges between the first and second surface.

14. The imaging system of claim 1, wherein the metal layer comprises copper.

15. A method for imaging, the method comprising:
providing a printed cavity comprising:
a metal layer having a first surface and a second surface, and defining a plurality of receive apertures and a plurality of transmit apertures extending between the first surface and the second surface; and
a substrate being attached to the first surface of the layer;
a metal layer covering edges of the substrate and forming a perimeter spaced substantially equidistant from the central location for forming a cavity structure; and
feeding a guided wave into the substrate at a substantially central location between the receive apertures and transmit apertures for exciting the apertures to produce a radiation pattern for illuminating a scene; and
using at least one antenna to generate a signal for imaging based on the illuminated scene.

16. The method of claim 15, wherein the layer comprises copper.

17. The method of claim 15, wherein the apertures are one of circular and rectangular in shape.

18. The method of claim 15, wherein the apertures each have a diameter of a wavelength within the substrate divided by about 1.8.

19. The method of claim 15, wherein the apertures each have a diameter of between about 2 millimeters and about 7 millimeters.

20. The method of claim 15, wherein the substrate is one of a dielectric substrate and an air-filled substrate.

21. The method of claim 15, wherein a number of the at least one antenna is 4.

22. The method of claim 15, wherein the apertures are arranged in one of a Mills-Cross pattern, a Fibonacci pattern, and a Golay pattern.

23. The method of claim 15, further comprising a coaxial probe and feed electrically connected to the substrate.

24. The method of claim 15, further comprising a ground plane being attached to the substrate on a side of the substrate that opposes a side of the substrate attached to the layer.

25. The method of claim 24, further comprising a coaxial probe and feed electrically connected to the substrate and the ground plane.

26. The method of claim 24, wherein the ground plane comprises copper.

27. The method of claim 15, wherein the substrate has first and second surfaces and a plurality of edges between the first and second surface.

28. The method of claim 15, wherein the metal layer comprises copper.

* * * * *